United States Patent
Wang et al.

(10) Patent No.: US 7,896,412 B2
(45) Date of Patent: Mar. 1, 2011

(54) CRASH BOX AND BUMPER FOR A MOTOR VEHICLE

(75) Inventors: Hui Wang, Paderborn (DE); Mirko Paare, Paderborn (DE); Christian Handing, Langenberg (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 12/775,057

(22) Filed: May 6, 2010

(65) Prior Publication Data

US 2010/0276950 A1     Nov. 4, 2010

Related U.S. Application Data

(63) Continuation of application No. 12/046,102, filed on Mar. 11, 2008, now abandoned.

(30) Foreign Application Priority Data

Mar. 12, 2007   (DE) ................. 10 2007 012 137

(51) Int. Cl.
    *B60R 19/34*   (2006.01)
(52) U.S. Cl. ..................................... 293/133
(58) Field of Classification Search ................. 293/133, 293/132, 151
    See application file for complete search history.

(56) References Cited

U.S. PATENT DOCUMENTS

| | | | | |
|---|---|---|---|---|
| 1,836,384 A * | 12/1931 | Mohr | ................ | 251/367 |
| 4,190,276 A * | 2/1980 | Hirano et al. | ................ | 293/133 |
| 4,272,114 A * | 6/1981 | Hirano et al. | ................ | 293/133 |
| 4,465,312 A | 8/1984 | Werner | | |
| 4,500,030 A * | 2/1985 | Gerber et al. | ................ | 228/125 |
| 4,545,605 A * | 10/1985 | Gerber et al. | ................ | 285/189 |
| 4,720,139 A * | 1/1988 | McSmith | ................ | 297/216.2 |
| 4,770,453 A | 9/1988 | Reynolds | | |
| 4,830,418 A * | 5/1989 | Gest | ................ | 293/134 |
| 4,913,268 A * | 4/1990 | Parker et al. | ................ | 188/322.19 |
| 4,976,481 A | 12/1990 | Yoshihira | | |
| 5,273,330 A | 12/1993 | Petry et al. | | |
| 5,427,214 A | 6/1995 | Prottengeier et al. | | |
| 6,174,009 B1 * | 1/2001 | McKeon | ................ | 293/133 |

(Continued)

FOREIGN PATENT DOCUMENTS

DE    1 172 558 B    6/1964

(Continued)

*Primary Examiner*—Kiran B. Patel
(74) *Attorney, Agent, or Firm*—Henry M. Feiereisen; Ursula B. Day (57) ABSTRACT

A crash box for placement between a bumper beam and a side rail of a motor vehicle includes a longitudinal profile made of two U-shaped shells having overlapping ends sized to realize a material doubling for increasing side stiffness and to suit the side stiffness to a load level. A flange plate is provided on a side-rail-proximal end of the longitudinal profile and has an opening for passage of the longitudinal profile. The side-rail-proximal end of the longitudinal profile is configured with a collar which is turned outwards. The collar rests against the flange plate and is joined with the flange plate. In the event of a collision, the longitudinal profile of the crash box is moved into the side rail as the longitudinal profile folds into the side rail starting from the flange plate, while the side-rail-proximal end of the longitudinal profile remains secured to the flange plate.

15 Claims, 6 Drawing Sheets

U.S. PATENT DOCUMENTS

| | | | |
|---|---|---|---|
| 6,231,095 B1 * | 5/2001 | Chou et al. | 293/133 |
| 6,299,226 B1 | 10/2001 | Kroning et al. | |
| 6,409,239 B1 * | 6/2002 | Tjoelker et al. | 293/133 |
| 6,523,873 B1 | 2/2003 | Summe et al. | |
| 6,554,176 B2 * | 4/2003 | McGill | 228/112.1 |
| 6,588,830 B1 * | 7/2003 | Schmidt et al. | 296/187.09 |
| 6,591,853 B1 * | 7/2003 | Rieck | 137/15.18 |
| 6,702,345 B1 | 3/2004 | Yoshida | |
| 6,799,794 B2 | 10/2004 | Mochidome et al. | |
| 6,834,898 B2 | 12/2004 | Wang et al. | |
| 6,893,063 B2 * | 5/2005 | Harrison et al. | 293/117 |
| 6,905,136 B2 | 6/2005 | Vidal et al. | |
| 6,929,297 B2 * | 8/2005 | Muller et al. | 293/133 |
| 7,047,703 B2 | 5/2006 | Waldrop | |
| 7,182,191 B2 * | 2/2007 | Scott et al. | 188/372 |
| 7,188,877 B2 | 3/2007 | Gonzalez et al. | |
| 7,192,067 B2 * | 3/2007 | Hansen | 293/133 |
| 7,213,867 B2 * | 5/2007 | Haneda et al. | 296/132 |
| 7,357,432 B2 | 4/2008 | Roll et al. | |
| 7,393,030 B2 | 7/2008 | Steeg et al. | |
| 7,407,206 B2 | 8/2008 | Arns et al. | |
| 7,413,226 B2 * | 8/2008 | Muskos | 293/133 |
| 2005/0014015 A1 * | 1/2005 | Hauger | 428/600 |
| 2005/0046207 A1 | 3/2005 | Rossmann | |
| 2007/0236025 A1 * | 10/2007 | Glasgow et al. | 293/133 |
| 2008/0018121 A1 | 1/2008 | Maya et al. | |
| 2008/0030031 A1 * | 2/2008 | Nilsson | 293/133 |
| 2008/0041268 A1 | 2/2008 | Seitzberger et al. | |
| 2008/0228356 A1 | 9/2008 | Nolze et al. | |
| 2009/0001737 A1 | 1/2009 | Salomonsson | |
| 2009/0085362 A1 * | 4/2009 | Terada et al. | 293/132 |

FOREIGN PATENT DOCUMENTS

| | | |
|---|---|---|
| DE | 43 16 164 A1 | 11/1994 |
| DE | 296 02 072 U1 | 5/1996 |
| DE | 297 15 786 U1 | 12/1997 |
| DE | 197 00 022 A1 | 7/1998 |
| DE | 100 14 469 A1 | 10/2001 |
| DE | 100 57 311 A1 | 5/2002 |
| DE | 10 2004 041 476 | 11/2005 |
| DE | 10 2005 026 444 | 12/2006 |

* cited by examiner

CRASH BOX AND BUMPER FOR A MOTOR VEHICLE

CROSS-REFERENCES TO RELATED APPLICATIONS

This application is a continuation of prior filed U.S. application Ser. No. 12/046,102, filed Mar. 11, 2008, now abandoned the priority of which is hereby claimed under 35 U.S.C. §120 and which claims the priority of German Patent Application, Serial No. 10 2007 012 137.9, filed Mar. 12, 2007, pursuant to 35 U.S.C. 119(a)-(d).

The contents of U.S. application Ser. No. 12/046,102 and German Patent Application, Serial No. 10 2007 012 137.9 are incorporated herein by reference in their entirety as if fully set forth herein.

BACKGROUND OF THE INVENTION

The present invention relates to a crash box for placement between a bumper beam and a side rail of a motor vehicle, and to a bumper provided with such a crash box.

Nothing in the following discussion of the state of the art is to be construed as an admission of prior art.

A standard bumper is typically mounted on the front or rear of a motor vehicle to absorb impact energy and thereby prevent damage to the vehicle structure in the event of a frontal or rear impact. The bumper typically includes a bumper beam which is mounted to the side rails of the vehicle frame through intervention of crash boxes. The bumper beam is provided to introduce energy, generated in the event of a collision, into the crash boxes which convert the impact energy into deformation work. The bumper structure is typically constructed in such a manner that the crash boxes are typically situated in midsection on the side rails and the impact energy is transferred via the bumper beam with smallest possible flexing into the crash boxes and ultimately into the side rails.

German Offenlegungsschrift DE 43 16 164 A1 describes a bumper which includes a slide-in tube made of two longitudinal sections of different cross sections. The longitudinal section with the smaller cross-section is fixedly connected to the bumper beam, whereas the longitudinal section with the greater cross section is mounted on the chassis of the motor vehicle. In the event of an impact, the smaller longitudinal section deforms into the greater longitudinal section, causing the wall of the longer section to fold back and to roll off the greater longitudinal section. Slide-in tubes of this type afford only little lateral stiffness.

A problem common to conventional bumpers is the fact that the available space for energy absorption is not utilized effectively in the event of an impact because the crash boxes form a block when deformed, thereby reducing the deformation path.

It would therefore be desirable and advantageous to address this problem and to obviate other prior art shortcomings.

SUMMARY OF THE INVENTION

According to one aspect of the present invention, a crash box for installation between a bumper beam and a side rail of a motor vehicle includes a longitudinal profile made of two U-shaped shells having overlapping ends sized to realize a material doubling for increasing a side stiffness and to suit the side stiffness to a load level, and a flange plate provided on a side-rail-proximal end of the longitudinal profile and having an opening for passage of the longitudinal profile, wherein the side-rail-proximal end of the longitudinal profile is configured with a collar which is turned outwards, with the collar resting against and joined with the flange plate.

The overlapping ends of the shells may be joined together, e.g. by a rolling welding seam. Likewise the collar may be joined to the flange plate through a welding operation.

By doubling the material in the area of the overlapping legs of the shells, the crash box receives a high side stiffness which can be suited to various loads, depending on the vehicle type, by adjusting the area of overlap. The high side stiffness also provides benefits in the event the vehicle is towed.

Energy absorption capability of the crash box is optimized because the longitudinal profile shifts in the event of a collision in length direction and is folded into the interior of the side rail. The longitudinal profile is pushed through the opening in the flange plate into the side rail of the vehicle frame. In this way, the available space can be used in its entirety as deformation path. The even deformation causes a substantially constant force level. Overall, the energy absorption capability is significantly increased.

According to another feature of the present invention, the collar may be turned inwards in a direction of the longitudinal profile. The collar may hereby be configured to wrap around a circumference of the longitudinal profile in the form of a ring. Suitably, the collar is formed of collar portions, with one of the collar portions formed in one piece with one of the shells, and with the other one of the collar portions formed in one piece with the other one of the shells.

The longitudinal profile rests with the collar upon the side-rail-distal side of the flange plate, i.e. on the flange plate side which is adjacent to the side rail, and is welded to the flange plate in this area. This may be realized by a continuous, circumferential welding seam, or intermittent welding seam, or spot welding seam. The stiffness of the collar may be adjusted by varying the geometric configuration of the collar, such as length of its marginal legs, radius of deformation and angle of the margin legs of the collar in relation to the body of the longitudinal profile. In this way, the functionally desired folding operation and its initialization can be controlled and triggered in the event of impact.

According to another feature of the present invention, the longitudinal profile may have rounded corners. The longitudinal profile is thus substantially rectangular with rounded length edges, as viewed in vertical cross section. As a result, side stiffness is further improved and positively affects the deformation and folding process.

According to another feature of the present invention, the longitudinal profile may have a bumper-beam-proximal end in the form of a slanted end surface. In this way, the leading end surface can thus be best suited to various geometries of the bumper beam to simplify assembly.

To adjust transverse stiffness and side stiffness as well as the section modulus, the shells may be made of different material, e.g. a combination of steels of different strength. Also, the material for the shells and the flange plate may differ. Moreover, the longitudinal profile may have varying wall thickness. It is further conceivable to provide the shells and/or the flange plate of different wall thickness. All these measures allow adjustment of the stiffness behavior and adjustment of a targeted deformation behavior of the crash box.

The longitudinal profile may also be manufactured with zones of different material strength through proper heat treatment. In this way, the folding process can be adjusted in dependence on the strength pattern.

According to another aspect of the present invention, a bumper for a motor vehicle includes a bumper beam extending transversely to side rails of a motor vehicle, and a crash box arranged between the bumper beam and one of the side rails, with the crash box including a longitudinal profile made of two U-shaped shells having overlapping ends sized to realize a material doubling for increasing a side stiffness and to suit the side stiffness to a load level, and a flange plate provided on a side-rail-proximal end of the longitudinal profile and having an opening for passage of the longitudinal profile, wherein the side-rail-proximal end of the longitudinal profile is configured with a collar which is turned outwards, with the collar resting against and joined with the flange plate, wherein the longitudinal profile of the crash box is constructed for movement into the side rail in the event of an impact.

The crash box is constructed such as to be able to completely fold into the side rail. As a result, more energy can be absorbed as no remaining block length exists and the available deformation path is fully utilized.

In the event of an impact, the longitudinal profile is pushed into the open end of the side rail, while the side-rail-proximal end of the longitudinal profile remains secured to the flange plate. The longitudinal profile thus everts in the attachment zone with the flange plate and rolls into the side rail. The collar is hereby configured to act as initiator for the folding process.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
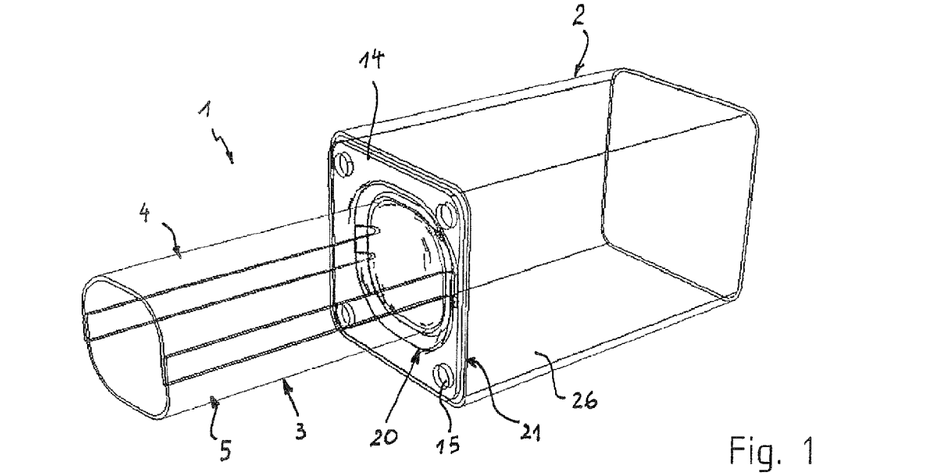
FIG. 1 is a fragmentary perspective view of a bumper structure having incorporated a crash box according to the present invention for attachment to a side rail of a motor vehicle.

Turning now to the drawing, and in particular to FIG. 1, there is shown a fragmentary perspective view of a bumper structure having incorporated a crash box according to the present invention, generally designated by reference numeral 1, for attachment to a side rail 2 of a motor vehicle. The crash box 1 is arranged between an unillustrated bumper beam and the side rail 2 to assume the function of a deformation element for energy absorption.

Figure 2:
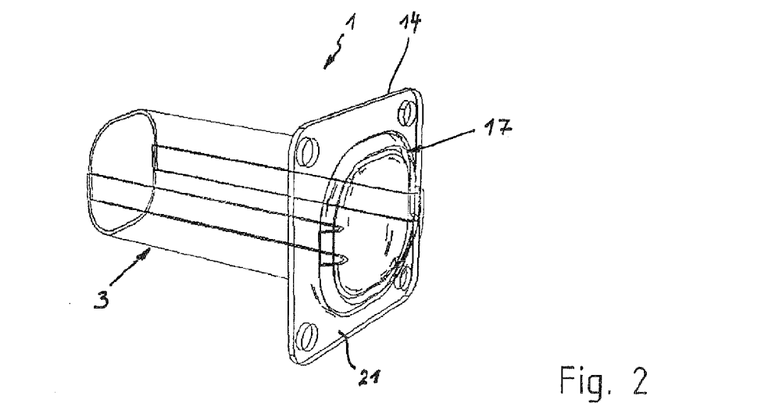
FIG. 2 is a rear, top and side perspective view of the crash box.
Figure 3:
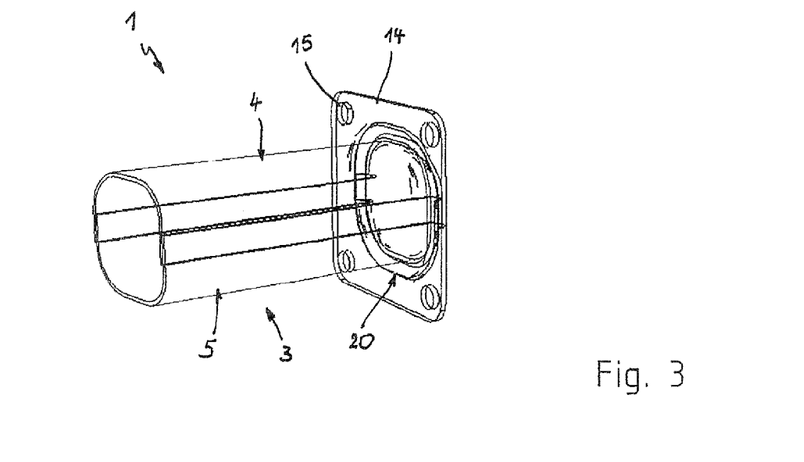
FIG. 3 is a front, top and side perspective view of the crash box.
Figure 4:
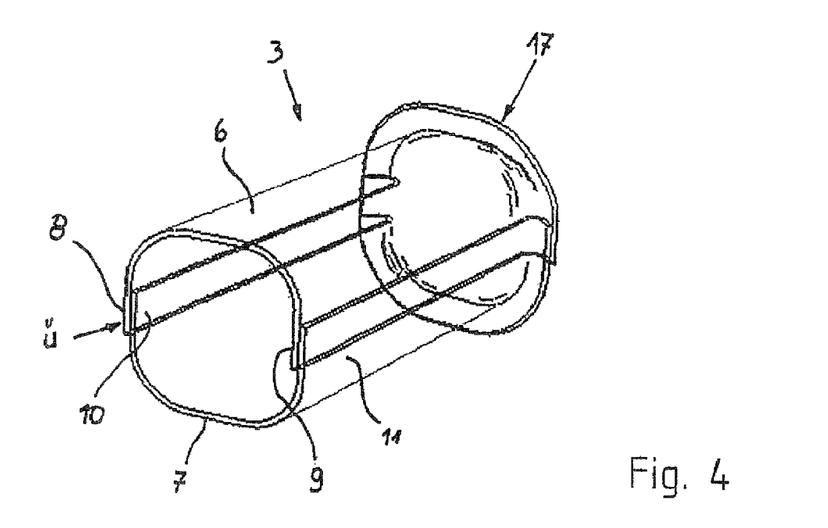
FIG. 4 is a front, top and side perspective view of a longitudinal profile of the crash box.
Figure 5:
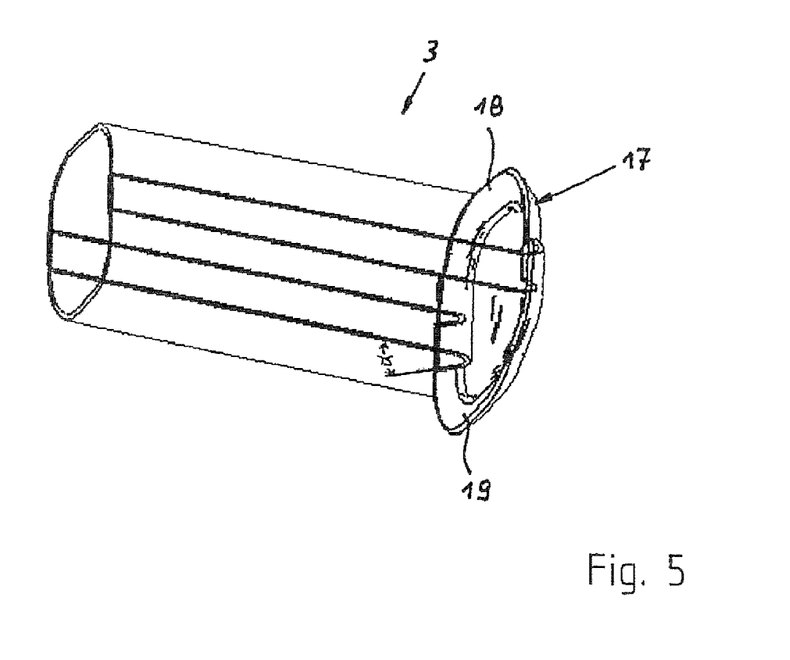
FIG. 5 is a top and side perspective view of the longitudinal profile.
Figure 8:
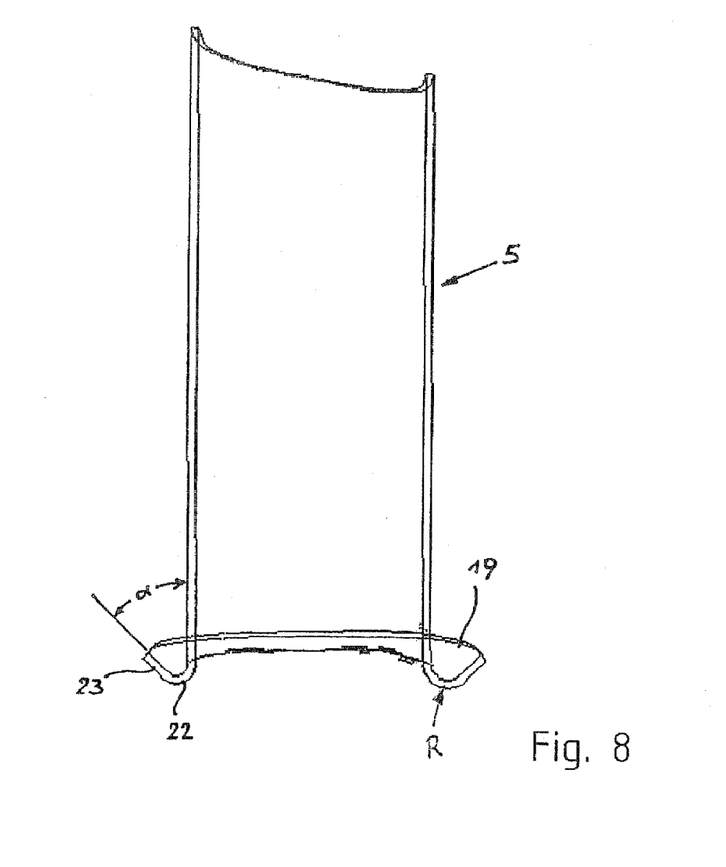
FIG. 8 is a front view of one shell of the longitudinal profile of FIG. 7.
Figure 9:
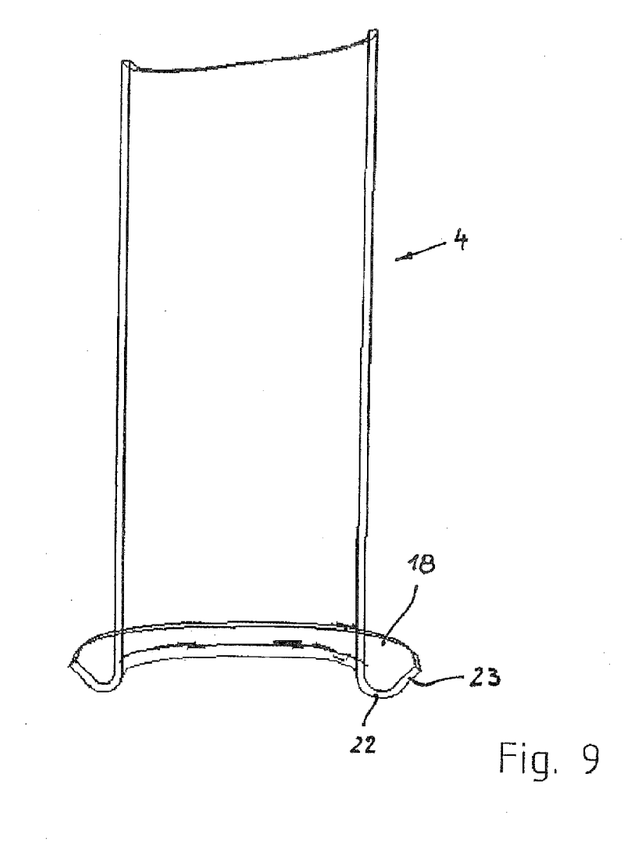
FIG. 9 is a front view of another shell of the longitudinal profile of FIG. 7.

As also shown in FIGS. 2 and 3, the crash box 1 is made of metal and includes a longitudinal profile 3 in shell construction comprised of two shells 4, 5 which can be of identical configuration, as shown by way of example in particular in FIGS. 8 and 9. The shells 4, 5 have a U-shaped configuration with a web 6, 7 and two side legs 8, 9, and 10, 11, respectively, as shown in FIG. 4. The shells 4, 5 have complementary configuration, with the side legs 8, 9; 10, 11 having overlapping ends, designated by reference symbol Ü. The overlapping ends of the side legs 8, 9; 10, 11 are joined together, e.g. by a rolling welding seam, in the respective overlap zones Ü. The side stiffness of the crash box 1 can be varied by adjusting the length of the side legs 8, 9; 10, 11 and the size of the overlap in the overlap zone Ü.

Figure 6:
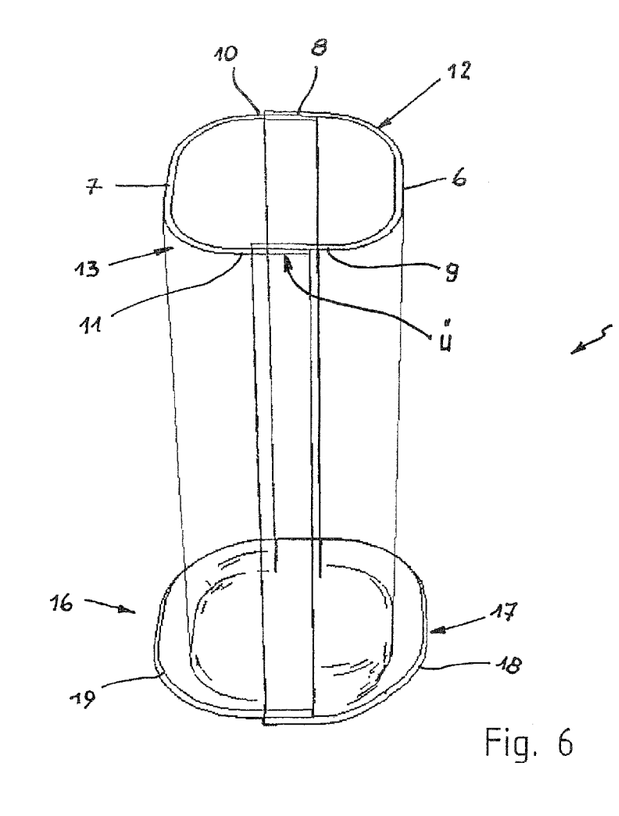
FIG. 6 is a front and side perspective view of the longitudinal profile.
Figure 7:
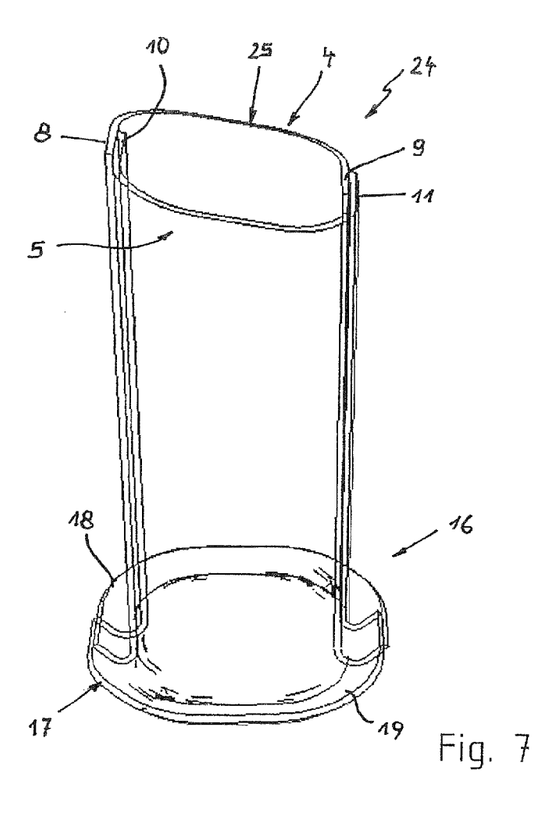
FIG. 7 is a front and side perspective view of a modified longitudinal profile of the crash box.

As indicated in FIG. 6 by reference numerals 12, 13, the longitudinal profile 3 has rounded corners or length edges so that manufacture is facilitated and implementation of a desired deformation process is realized.

A flange plate 14 is provided on the longitudinal profile 3 on a side proximal to the side rail 2, for attachment of the crash box 1 to the side rail 2 via mounting openings 15 (FIGS. 1-3). The flange plate 14 is formed with a central opening 20 of generally rectangular configuration to conform to a generally rectangular cross section of the longitudinal profile 3. Using a rectangular shape of the longitudinal profile 3 results in a greater section modulus and increased transverse stiffness. The longitudinal profile 3 extends through the opening 20 and rests with its collar 17 against a longitudinal-profile-distal side of the flange plate 14. The collar 17 is hereby welded to the flange plate 14 to secure the longitudinal profile 3 on the flange plate 14.

As can be seen in particular in FIGS. 4-7, the longitudinal profile 3 has a side-rail-proximal end 16 which is configured with an outwardly folded collar 17. The collar 17 is turned outwards in the direction of the longitudinal profile 3 and extends in the form of a ring radially about the circumference of the longitudinal profile 3. The collar 17 of the longitudinal profile 3 is made of collar portions 18, 19 which are formed in one piece with the shells 4, 5, respectively, as shown in particular in FIGS. 8 and 9.

The collar portions 18, 19 of the collar 17 are each formed in cross section with an arcuate portion 22 which has a radius R extending from the side-rail-distal end 16 to a straight marginal leg 23. The marginal leg 23 of each collar 17 extends hereby at an angle a in the direction of the longitudinal profile 3, as shown in FIG. 8. The angle a between the wall of the longitudinal profile 3 and the collar 17 ranges between 20° and 70°, preferably between 40° and 50°. Currently preferred is an angle a of 45°. As a result, the folding operation is initiated in an optimum manner and the longitudinal profile 3 can easily be attached to the flange plate 14. The radius R of the arcuate portion 22 varies circumferentially in the course of the collar portions 18, 19 so that the collar portions 18, 19 fit snugly with one another, when the shells 4, 5 are joined.

The configuration of the longitudinal profile 3 can be suited to the geometry of a bumper beam by providing the longitudinal profile 3, when installing the crash box 1 in a motor vehicle, with a bumper-beam-proximal end 24 which has a slanted end surface 25.

In the event of a collision, the longitudinal profile 3 moves in longitudinal direction through the opening 20 in the flange plate 14 and folds as it enters the open end 26 of the side rail 2, while the longitudinal profile 3 remains attached via the collar 17 onto the flange plate 14. The material of the longitudinal profile 3 crumples through the opening inwards and rolls through the area of the collar 17 into the side rail 2. As a result, energy is absorbed in an optimum manner in the event of an impact and the available space in the side rail 2 can be used in its entirety as deformation path. The deformation is hereby effected at substantially constant force level with significantly increased energy absorption capability.

Figure 12:
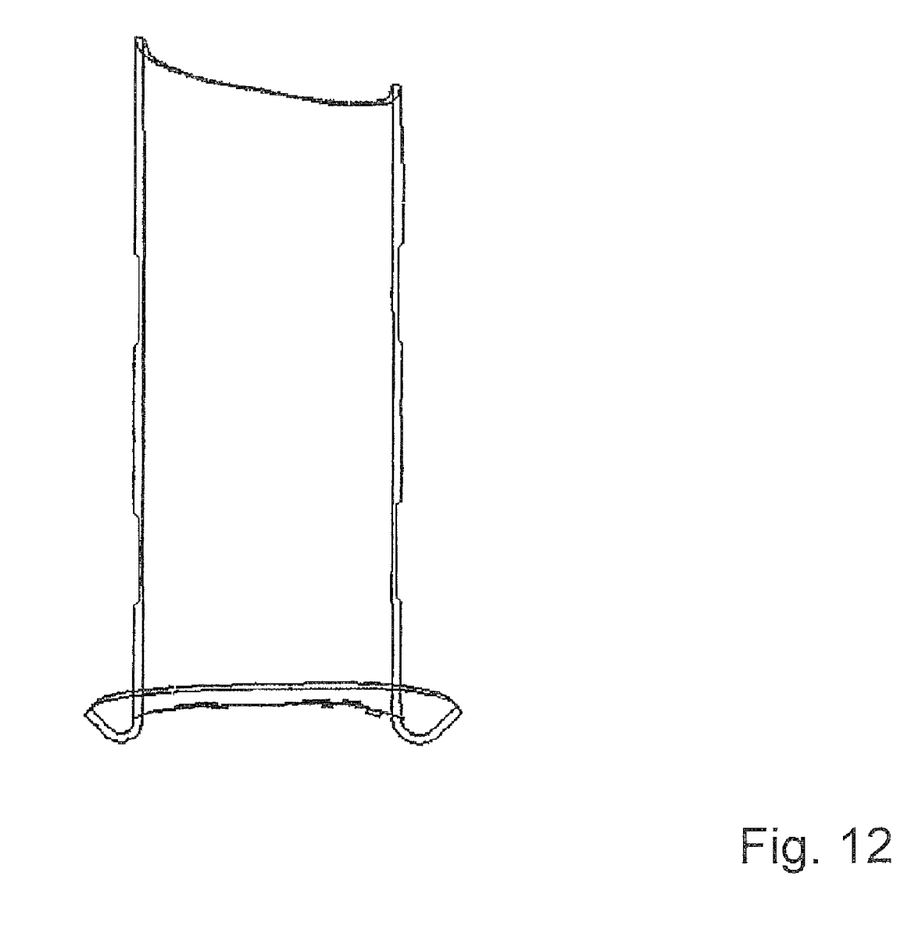
FIG. 12 is a front view of an example of a shell of a longitudinal profile with varying wall thickness.

The stiffness behavior of the crash box 1 as well as the deformation behavior can be adjusted by making the shells 4, 5 and/or the flange plate 14 of different materials, e.g. of steels of different strength. Also the wall thickness of the longitudinal profile 3 may vary in longitudinal direction, as shown by way of example in FIG. 12, or the shells 4, 5 and the flange plate 14 may be made of different wall thicknesses.

Figure 10:
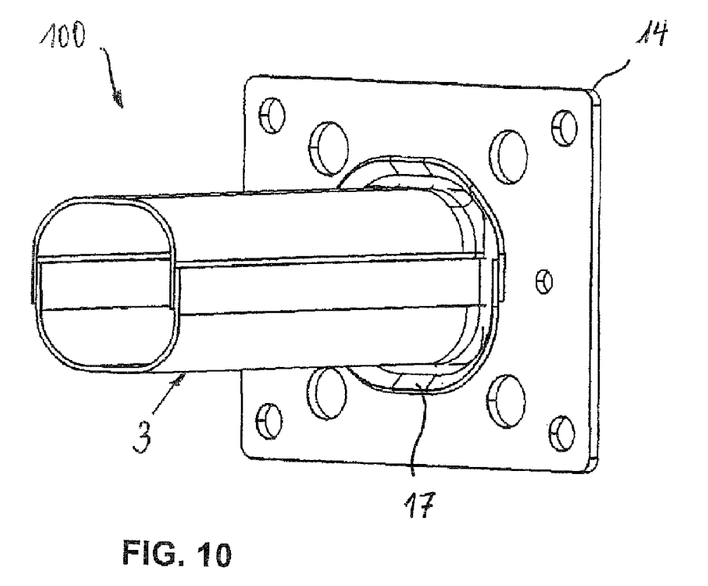
FIG. 10 is a front, top and side perspective view of a modified crash box.
Figure 11:
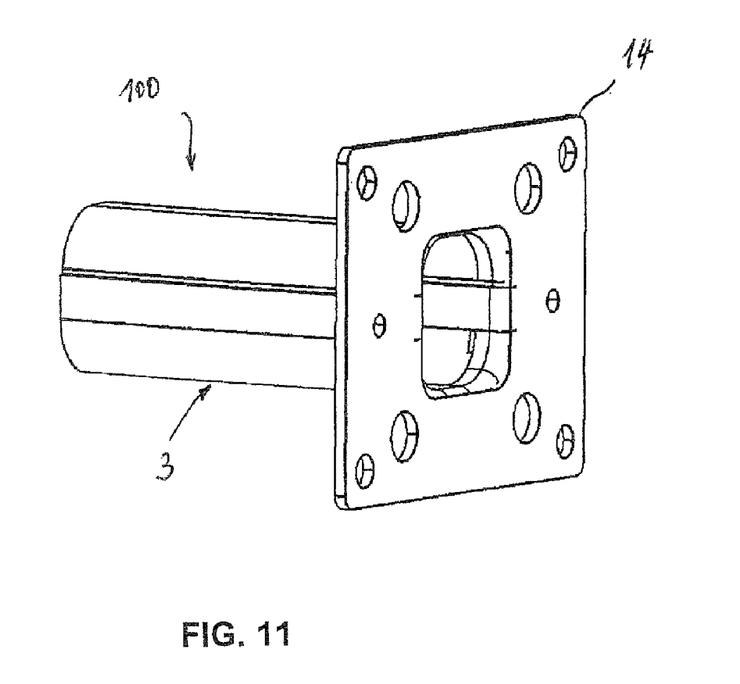
FIG. 11 is a rear, top and side perspective view of the crash box of FIG. 10.

Referring now to FIGS. 10 and 11, there are shown two perspective views of a modified crash box, generally designated by reference numeral 100. Parts corresponding with those in FIG. 1 are denoted by identical reference numerals and not explained again. The description below will center on the differences between the embodiments. In this embodiment, provision is made for attachment, e.g. through a welding operation, of the collar 17 of the longitudinal profile 3 to the flange plate 14 on the longitudinal-profile-proximal side of the flange plate 14.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A crash box for placement between a bumper beam and a side rail of a motor vehicle, said crash box comprising:

a longitudinal profile made of two U-shaped shells having overlapping ends sized to realize a material doubling for increasing a side stiffness and to suit the side stiffness to a load level; and a flange plate provided on a side-rail-proximal end of the longitudinal profile and having an opening through which the longitudinal profile passes, wherein the side-rail-proximal end of the longitudinal profile is configured with a collar which is turned outwards and extends in a direction of the longitudinal profile, thereby defining an angle between 20° and 70° between the longitudinal profile and the collar, said collar resting against and joined with the flange plate on a flange plate side distal to the longitudinal profile.

2. The crash box of claim 1, wherein the shells are identical.

3. The crash box of claim 1, wherein the collar is turned in a direction of the longitudinal profile.

4. The crash box of claim 1, wherein the collar is configured to wrap around a circumference of the longitudinal profile in the form of a ring.

5. The crash box of claim 1, wherein the collar is joined to a longitudinal-profile-distal side of the flange plate.

6. The crash box of claim 1, wherein the collar is formed of collar portions, with one of the collar portions formed in one piece with one of the shells, and with the other one of the collar portions formed in one piece with the other one of the shells.

7. The crash box of claim 1, wherein the longitudinal profile has rounded corners.

8. The crash box of claim 1, wherein the shells are made of different material.

9. The crash box of claim 1, wherein the shells and the flange plate are made of different material.

10. The crash box of claim 1, wherein the longitudinal profile has a varying wall thickness.

11. The crash box of claim 1, wherein the shells are made of different wall thickness.

12. The crash box of claim 1, wherein the shells and the flange plate are made of different wall thickness.

13. The crash box of claim 1, wherein the angle between the longitudinal profile and the collar ranges between 40° and 50°.

14. The crash box of claim 1, wherein the angle between the longitudinal profile and the collar is 45°.

15. The crash box of claim 1, wherein the longitudinal profile and the opening have a rectangular cross section, with the longitudinal profile being aligned with the opening.

* * * * *